Patented Feb. 19, 1924.

1,483,885

UNITED STATES PATENT OFFICE.

CARL OSCAR HOEN, OF ST. PAUL, MINNESOTA

ELECTROLYTE.

No Drawing.   Application filed June 8, 1922.   Serial No. 566,868.

*To all whom it may concern:*

Be it known that I, CARL OSCAR HOEN, a citizen of the United States, residing at St. Paul, in the county of Ramsey and State of Minnesota, have invented a new and useful Improvement in Electrolytes, of which the following is a specification.

My invention relates to electrolytes for storage batteries and has for its object to produce an electrolyte which preserves the life of a storage battery and permits the same to be more readily charged when run down.

Another object is to produce an electrolyte which may readily be substituted for the existing electrolyte in partly worn out batteries which would permit the same to be readily charged thereby increasing the usefulness of the same.

Another object is to provide a solution which may be made in highly concentrated form and which can be readily shipped or stored and which can be diluted as required, thereby saving freight charges and capacity of containers.

In the use of storage batteries where a dilute sulphuric acid alone is used as the electrolyte, it has been found that if the battery has been used for considerable period of time, the plates become readily sulphated and it is exceedingly difficult to make the battery take and maintain the proper charge. I overcome this difficulty by adding to the sulphuric acid, a mixture of sulphate of magnesium and alum, which eliminates the undesirable properties in the battery, rendering the same more useful and prolonging the life of the battery.

In preparing the electrolyte I prefer to use the ingredients in about the following proportions, namely:

Seven gallons of distilled water;
Eleven and one-half gallons sulphuric acid;
Eighteen pounds magnesium sulphate,
And one pound alum dissolved in two gallons water.

Good results, however, may be obtained when the portions are slightly varied though I find the best results obtained by using the chemicals in the exact proportions. The electrolyte may be prepared as follows. To make 41 gallons of the finished electrolyte when diluted, I first make 20½ gallons of the concentrated solution as follows:

Into seven gallons of distilled water, slowly pour eleven and one-half gallons of sulphuric acid ($H_2SO_4$) stirring the same constantly. This should bring the specific gravity of the solution up to 1.600. Let the solution cool until the temperature falls below 120 degrees F. After this stir into the solution eighteen pounds of sulphate of magnesium ($MgSO_4$) until dissolved. Stirring in the sulphate of magnesium add a solution of alum prepared by dissolving one pound of alum into two gallons of water. After all of these ingredients have been embodied into the solution, the specific gravity should measure 1.550.

The solution as above prepared makes a concentrated stock solution which may be stored for use until required. In using the electrolyte add an equal amount by volume, of distilled water to the stock solution, gradually stirring the same and then allowing to cool below 70° F. This makes a solution which can be directly placed in the battery, as soon as the battery has been properly cleaned out from dirt and any deposit which may be accumulated within the same. When this solution is cool the specific gravity will measure 1.300.

The advantages of my invention are manifest. The electrolyte prevents excessive sulphation and breaks down the white lead sulphate when formed. This has the effect of increasing the life and usefulness of storage batteries to a great extent. My invention is particularly useful in used batteries where the plates have become sulphated, as the activity of the battery is fully restored and the battery brought to a serviceable condition. The electrolyte may be prepared as a stock solution which may be indefinitely kept until desired for use, at which time the same can be conveniently diluted to the proper specific gravity.

In accordance with the patent statutes, I have described the principles of operation of my invention, together with the ingredients which I now consider to represent the best embodiment thereof, but I desire to have it understood that the receipt described is only illustrative and that the invention can be carried out by other means and applied to uses other than those above set forth within the scope of the following claims.

I claim:

1. An electrolyte comprising a solution of sulphuric acid, sulphate of magnesium and alum.

2. An electrolyte comprising a solution consisting of ingredients mixed in about the following proportions: distilled water, seven gallons; sulphuric acid, eleven and one-half gallons; sulphate of magnesium, eighteen pounds and a solution of alum prepared by dissolving one pound alum in two gallons of water, diluted with an equal amount by volume of water.

In testimony whereof I affix my signature.

CARL OSCAR HOEN.